United States Patent [19]

Elamin

[11] Patent Number: 5,378,266

[45] Date of Patent: Jan. 3, 1995

[54] AIR DRYER SYSTEM

[75] Inventor: Naman A. Elamin, Avon Lake, Ohio

[73] Assignee: AlliedSignal Inc., Morristown, N.J.

[21] Appl. No.: 100,884

[22] Filed: Aug. 2, 1993

[51] Int. Cl.$^6$ ............................................. B01D 41/00
[52] U.S. Cl. .......................................... 96/114; 95/21; 95/26; 96/130; 96/133
[58] Field of Search ............... 95/21, 26; 96/113, 114, 96/115, 121, 130, 131, 133, 143

[56] References Cited

U.S. PATENT DOCUMENTS

| | | | |
|---|---|---|---|
| 3,659,399 | 5/1972 | Kauer, Jr. et al. | 96/130 |
| 3,902,875 | 9/1975 | Bridigum et al. | |
| 4,108,617 | 8/1978 | Frantz . | |
| 4,113,451 | 9/1978 | Frantz . | |
| 4,306,889 | 12/1981 | Kruger et al. . | |
| 4,468,239 | 8/1984 | Frantz . | |
| 4,519,819 | 5/1985 | Frantz . | |
| 4,525,183 | 6/1985 | Cordes et al. | 96/130 |
| 4,721,515 | 1/1988 | Hata et al. . | |
| 4,765,806 | 8/1988 | Doto . | |
| 4,806,134 | 2/1989 | Lhota . | |
| 4,812,148 | 3/1989 | Hata et al. . | |
| 4,830,641 | 5/1989 | White, Jr. et al. . | |
| 4,832,711 | 5/1989 | Christel, Jr. et al. | 96/130 |
| 4,891,051 | 1/1990 | Frantz . | |
| 4,971,610 | 11/1990 | Henderson . | |
| 4,983,190 | 1/1991 | Verrando et al. | 96/130 |
| 5,002,591 | 3/1991 | Stanford | 95/26 |
| 5,209,764 | 5/1993 | Eberling . | |

FOREIGN PATENT DOCUMENTS

| | | |
|---|---|---|
| 3210030a | 3/1982 | Germany . |
| 3514473A | 4/1985 | Germany . |
| 797746 | 1/1981 | U.S.S.R. ........................ 96/115 |

*Primary Examiner*—Charles S. Bushey
*Attorney, Agent, or Firm*—Ken C. Decker

[57] ABSTRACT

A compressed air system includes an air drying subsystem which can be configured either in an intermittent mode, in which a separate purge volume intermittently purges the desiccant used by the air drying systems when the compressor goes off load, or in a continuous flow mode, in which the purge volume is replaced by a second desiccant cartridge and the two desiccant cartridges are alternatively purged and used to dry the compressed air.

5 Claims, 2 Drawing Sheets

AIR DRYER SYSTEM

This invention relates to a compressed air system having an air drying subsystem.

BACKGROUND OF THE INVENTION

Compressed air systems are widely used in both industrial and automotive applications. One major use of compressed air systems is to operate the braking systems of heavy duty vehicles. Since moisture in compressed air denigrates the system components, it has become customary to provide an air dryer to remove the moisture entrained in the compressed air used in compressed air systems. Common air dryer designs include a desiccant bed through which the compressed air is passed. The moisture is purged from the desiccant bed periodically by backflowing, at relatively Low pressure, a quantity of compressed air which has been segregated and which is then discharged to atmosphere.

Compressed air braking systems are used on large line haul trucks, which may operate for several hours without having a brake application effected. Accordingly, the compressor is on load during a relatively short period of time during vehicle operation and is unloaded during the majority of time that the vehicle is operated. The air requirements for this type of application are relatively low, and the desiccant in the air dryer will be open to atmosphere for far longer than the time required to purge the moisture from the desiccant. On the other hand, air dryers are also used on vehicles equipped with compressed air braking systems in which air consumption is relatively high, such as transit buses and other delivery vehicles. In these vehicles, the compressor is not unloaded for long enough at any one time to assure complete purging of the moisture from the desiccant in the air dryer. Accordingly, many of these high air consumption vehicles are equipped with continuous flow air drying subsystems, in which a pair of air dryers are used so that one of the air dryers is being purged while the other one is drying air. A timing control is used to switch between the air dryers. This type of air drying system is commonly referred to as a "continuous flow" air dryer; the air dryer system used on heavy duty line haul trucks with relatively low air consumption requirements is commonly referred to as "intermittent type" air drying systems.

In the so-called intermittent type systems, a small portion of the air is segregated in a purge volume and is used to backflow through the desiccant when the air compressor goes off load. The purge volume in which the purge air is stored is commonly made a part of the same housing containing the desiccant. However, this results in a much larger air dryer housing, thereby complicating installation requirements. Accordingly, some such systems are provided with a separate purge volume.

SUMMARY OF THE INVENTION

Obviously, industry requirements for two totally different air drying systems for vehicles with high and low air consumption poses economic problem in their manufacture, since separate tooling, part stock, etc. are required for the two different systems. The present invention provides an air dryer subsystem which is configurable in either an intermittent mode or a continuous flow mode, and uses many common components, thus saving on tooling costs and requiring fewer parts be stocked than would be required with two completely different air drying systems. The present invention also provides for a continuous flow system in which a timer generates pressure signals to operate shuttle valves controlling the drying and purging cycles of the air dryer.

BRIEF DESCRIPTION OF THE DRAWING

These and other advantages of the present invention will become apparent from the following description, with reference to the accompanying drawings, in which.

DESCRIPTION OF THE PREFERRED EMBODIMENTS

Figure 1:
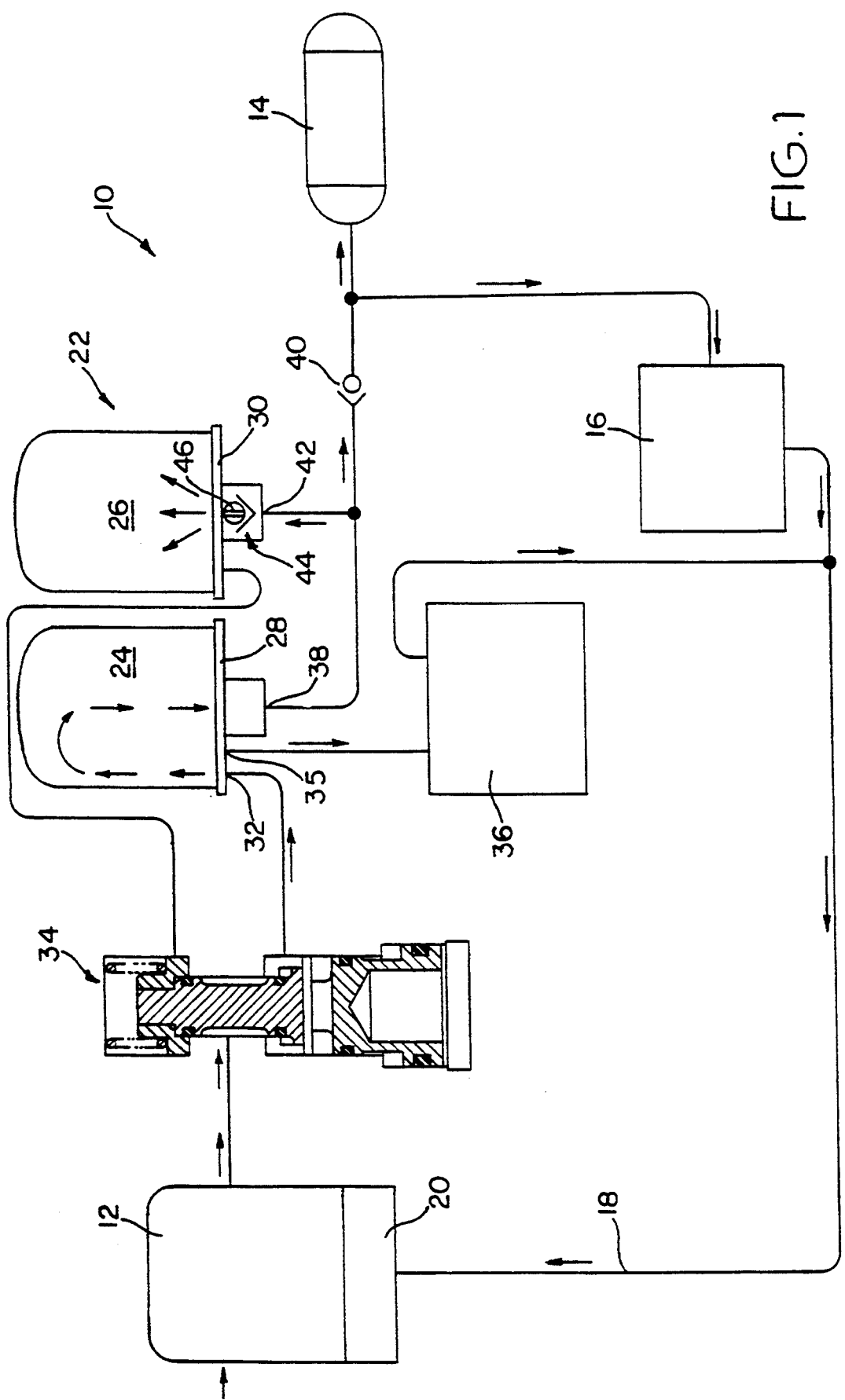
FIG. 1 is a schematic illustration of a compressed air system having an air drying subsystem configured in an intermittent drying mode.

Referring now to the drawings, a compressed air system generally indicated by the numeral 10 includes an air compressor 12 which, if the system 10 is used as an air brake system on a vehicle, is powered by the vehicle engine. Compressor 12 generates compressed air which is stored in a reservoir 14. A conventional governor 16 is responsive to the pressure level in the reservoir 14 to generate a pressure signal on line 18 when the pressure level in the reservoir 14 attains a predetermined level. A conventional unloader 20, which is usually mounted on the air compressor 12, responds to the pressure signal on the line 18 to unload the compressor 12 when the pressure level in the reservoir 14 attains a predetermined level and to again place the compressor 12 on load when the pressure level in reservoir 14 drops below a another (lower) predecided pressure level. The compressor 12 may also be disabled by a pressure responsive clutch (not shown) instead of the unloader 20. In any event, the compressor is enabled to supply air to the reservoir 14, and is then disabled when the pressure in reservoir 14 attains a predetermined level.

Figure 2:
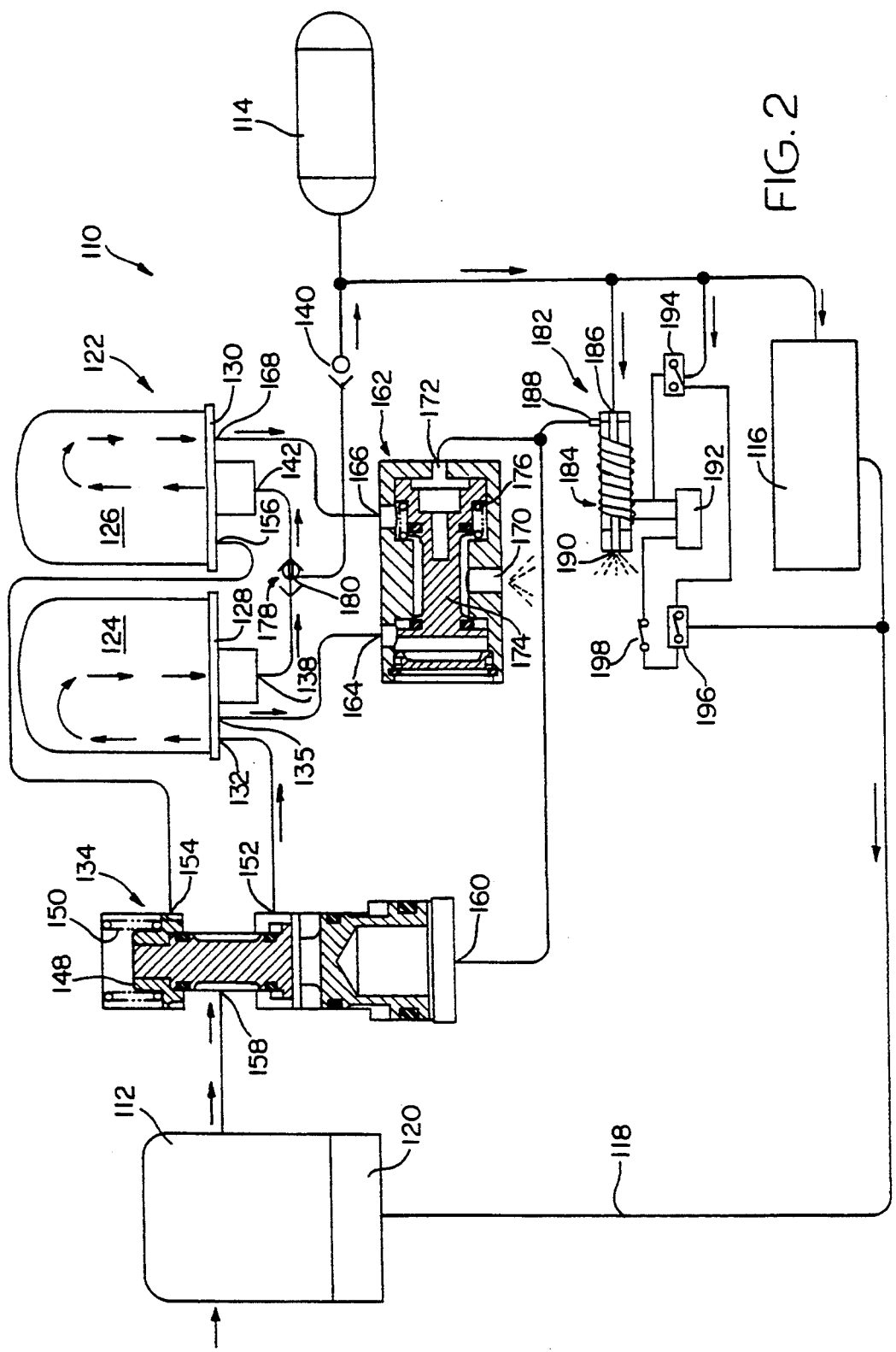
FIG. 2 is a schematic illustration similar to FIG. 1 illustrating the air drying subsystem configured in the continuous flow mode.

An air drying subsystem generally indicated by the numeral 22 is interposed between the compressor 12 and the reservoir 14. The subsystem 22 includes a pair of cartridges 24, 26 which are mounted on bases 28, 30. The cartridges 24, 26, are preferably of the so-called "spin-on" type, and which may be installed and removed on their corresponding bases 28, 30 by rotating the cartridge relative to the base. The cartridges 24, 26 are substantially identical, except that the cartridge 24 contains a desiccant material and the cartridge 26 is an empty volume for storing compressed air. Base 28 includes an inlet port 32, which is connected to the outlet of compressor 12 through a shuttle valve 34, which is nonfunctional when the air drying system 22 is configured in the intermittent mode as illustrated in FIG. 1, but is functional when the subsystem 22 is configured in the continuous flow mode, as illustrated in FIG. 2. The shuttle valve 34, in order to save tooling costs, may be combined with other elements used in the subsystem 22 and accordingly is available if the subsystem 22 is configured in the continuous flow mode as illustrated in FIG. 2. Base 28 further includes a purge outlet port 35 which is connected to a conventional purge valve 36, which, as hereinafter will be described, controls communication between the purge port 35 and atmosphere. Base 28 further includes an outlet port 38 which is connected to the reservoir 14 through a one way check valve 40 which permits communication into the reservoir 14 from the subsystem 22, but prevents communication in the reverse direction.

The base 30 is substantially identical to the base 28, except that, the inlet port 32 and purge port 35 have been plugged. Base 30 includes a port 42, which corresponds to the port 38 of the base 28. Port 42 is connected to outlet port 38 at a point between the outlet port 38 and the check valve 40. A check valve 44 permits communication into the volume defined within the cartridge 26, but permits flow out of the cartridge 26 only at a limited rate permitted by the orifice 46 to purge the desiccant within the canister 24 as will hereinafter be described.

In operation, compressed air generated by the compressor 12 enters cartridge 24 through inlet port 32 passes through the desiccant container therein, and passes through outlet port 38 and through check valve 40 to the reservoir 14. A portion of the compressed air passes through port 42 and into the purge volume defined within the cartridge 26. When the governor 16 senses that the pressure level in the reservoir 14 has attained the predetermined pressure level, the governor 16 generates a pressure signal in line 18 which causes the unloader 20 to unload the compressor 12, as is well known to those skilled in the art. The pressure signal in line 18 is also transmitted to purge valve 36, which opens the purge valve to atmosphere, thereby dropping the pressure level in the desiccant within the cartridge 24 to below the pressure level of the compressed air stored in the purge volume defined within the cartridge 26. Accordingly, compressed air stored in the purge volume 26 bleeds through the orifice 46 and communicates through the outlet port 38 and through the desiccant in the cartridge 24, thereby purging the latter of its moisture. The purge air is discharged through the purge valve 36 to atmosphere. Since the pressure level in the reservoir 14 is substantially greater than that just downstream of the orifice 46 during purging, the check valve 40 remains closed. When the pressure in the reservoir 14 drops below the predecided pressure level, the governor 16 terminates the pressure signal on line 18, thereby causing unloader 20 to again place the compressor 12 on load and to thereby close the purge valve 36. Accordingly, compressed air is again transmitted to the reservoir 14 through the air drying subsystem 22.

FIG. 2 illustrates the system of FIG. 1 configured in the continuous flow mode. Many of the components used in the configuration of FIG. 2 are identical to those used in the configuration of FIG. 1, thereby saving substantial tooling and inventory expense. The elements in FIG. 2 which are substantially the same as those in FIG. 1 retain the same reference characters, but increased by 100. In FIG. 2, the shuttle valve 134 includes a shuttle 148 which is urged downwardly, viewing the Figure, by a spring 150. A pressure line connects a port 152 of shuttle valve 134 to port 132 on the base 128, and another port 154 is connected to an inlet port 156 on the base 130. The inlet port 156 is the aforementioned plugged inlet port in the embodiment of FIG. 1, but is used in the configuration of FIG. 2. Shuttle valve 234 also includes port 158 which is connected to the compressor 112. Shuttle valve 134 further includes a control port 160 which receives a pressure signal as will hereinafter be described. As can be seen from the drawing, when the port 160 is at low pressure, the spring 150 urges the shuttle 148 to a position closing off the port 154 and communicating the port 152 with the port 158, thereby communicating the pressure generated by the compressor 112 to the inlet port 132 on the base 128.

Subsystem 122 further includes a purge control shuttle valve generally indicated by the numeral 162. Purge shuttle valve 162 includes a port 164, which is connected to the purge port 135 on the base 128. Shuttle valve 162 further includes a port 166, which is connected to a purge outlet port 168. Purge control valve 162 further includes an exhaust port 170 and a control port 172 which receives a pressure signal as will hereinafter be described. A shuttle 174 slidably mounted within the valve housing is responsive to the pressure at control port 172 to control communication between the ports 164, 166 and the exhaust port 170. A spring 176 yieldably urges the shuttle 174 to the right, viewing FIG. 2; accordingly, when the pressure at control port 172 is low, the port 166 is connected to the exhaust port 170 and the port 164 is closed off. Similarly, when a high pressure signal is communicated to control port 172, the shuttle 174 shifts to the left, viewing FIG. 2, thereby closing the port 166 and opening the port 164 to the exhaust port 170.

The check valve 46 in the configuration of FIG. 1 is replaced by a double-acting check valve generally indicated by the numeral 178 in the configuration of FIG. 2. Double-acting check valve 178 includes a flow restricting orifice 180 that permits limited, low pressure flow through the check valve even if it is engaged on one of the valve seats. The third branch of the double-acting check valve is connected to the check valve 140 and to the reservoir 114. Accordingly, the double-acting check valve 178 will communicate the port 138 or the port 142 to the reservoir 114, depending upon the relative pressure levels between the ports, the higher pressure level being communicated to the reservoir 114. However, the orifice 180 does allow limited flow at low pressure to the port 138 or 142 that is not communicated to the reservoir 114, as will hereinafter be described.

The control pressure signal transmitted to control ports 160, 172 is generated by a timing mechanism generally indicated by the numeral 182. Timing mechanism 182 includes a three-way, normally closed solenoid valve generally indicated by the numeral 184, which includes a supply port 186 connected to the pressure level in the reservoir 114, a delivery port 188, which is connected to the control ports 160 and 172, and an exhaust port 190 which is opened to atmosphere. When the solenoid windings of the valve 184 are deenergized, port 186 is closed and port 188 is vented to the exhaust port 190. However, when the windings are energized, the exhaust port 190 is closed and supply port 186 is communicated to delivery port 188, thereby generating the pressure signal communicated to the ports 160 and 172. The solenoid valve 184 is controlled by a conventional timer 192 which turns on the windings for a predetermined time period as the timer 192 times out, and then turns off the windings for a corresponding time period. The timer 192 is controlled by a normally open pressure switch 194 and a normally closed pressure switch 196, and the vehicle ignition switch 198. The pressure switch 194 is responsive to the pressure level in the reservoir 114 so that the normally open switch 194 is closed when a predetermined pressure level is attained, thereby enabling the timer 192 assuming that the switches 196 and 198 remain closed. Switch 196 is opened when the pressure signal is generated on line 118 by the governor 116, disabling the timer 192, and returning solenoid valve 184 to its normally closed position. It will be noted that the switch 194 will be closed at a pressure level substantially lower than that at which the governor 116 generates the pressure signal on line 118.

In operation, the various components in FIG. 2 are illustrated in position they assume when the pressure level in the reservoir 114 is below the pressure level at which the switch closes. In this condition, the pressure level transmitted to control ports 160, 172 is low, so that the shuttles 148 and 174 are in the positions illustrated in the drawings. In this condition, the pressure generated by the compressor 112 is communicated to inlet port 132, passes through the desiccant in the cartridge 124 and leaves the cartridge 124 through the outlet port 138. The compressed air then passes through the double check valve 178, and through the check valve 140 to the reservoir 114. It will be noted that even though check valve 178 substantially closes communication to the port 142, the orifice 180 permits limited, low pressure communication into the port 142. Accordingly, a portion of the compressed air delivered by the port 138 is used to purge the desiccant in the cartridge 126. This purge air passes through the port 142, through the desiccant within the cartridge 126, out of the purge outlet port 168, and to the port 166 of the purge shuttle control valve 162. Port 166 is communicated to the port 170; accordingly, purge air, and the moisture entrained therein picked up from the desiccant in the cartridge 126, also will be discharged to atmosphere.

At the predetermined pressure level, the switch 194 is closed, thereby starting the timer 192 to energize the solenoid valve 184. Accordingly, a pressure signal is delivered to ports 160, 172 of the valves 158, 162. The shuttle 148 in the valve 134 is driven upwardly, viewing FIG. 2, against the bias of the spring 150. Communication from the compressor 112 to the inlet pore 132 will be cut off, and pressure communication to the inlet port 156 on the base 130 will be initiated. Accordingly, the moisture entrained in the compressed air delivered by the compressor 112 will be removed by the desiccant in the cartridge 126. The compressed air will then leave the cartridge through the outlet port 142, pass through the double-acting check valve 178 (the position of which will have shifted) to open substantially uninhibited communication between the outlet port 142 and the check valve 140 due to the higher pressure level at the port 142, thereby delivering compressed air to the reservoir 114. As above, a portion of the compressed air exiting through the port 142 will be bled off through the flow restricting orifice 180 and used to purge the desiccant in the cartridge 124. Because of the control signal present at port 172 of purge control shuttle valve 168, the port 166 will be closed off and communication between the port 164 and the exhaust port 170 will be initiated. Accordingly, the purge air passing through the desiccant within the cartridge 124, and the moisture entrained therein, will be discharged to atmosphere. After the timer times out, the signals at the control ports 160, 172 will be removed, thereby causing the shuttle valve 134 to switch communication from the compressor back to the desiccant within the cartridge 124.

The subsystem 122 continues to switch back and forth between the cartridges 124, 126 until the pressure level in the reservoir 114 attains the cutout pressure at which the governor 116 generates the pressure signal in line 118 to cause the unloader to unload the compressor 112. At this time, the pressure in line 118 also opens normally closed switch 196, thereby removing power to the timer 192 and prevent energization of the solenoid valve 184. Accordingly, the components illustrated are returned to the positions illustrated in FIG. 2, until the governor 116 senses a reduced pressure level in the reservoir 114, whereupon the pressure signal on line 118 will be removed thereby permitting the normally closed switch 196 to again be closed. Accordingly, the timer 192 will again be enabled, resuming the timing cycles which the valve 134, 162 to switch communication periodically between the desiccant in the cartridge 124 and the desiccant in the cartridge 16.

I claim:

1. Compressed air apparatus comprising a compressor, a reservoir for storing compressed air generated by said compressor, disabling means for disabling said compressor, a governor responsive to a pressure level in the reservoir for generating a governor pressure signal causing said disabling means to disable said compressor when the pressure level in the reservoir attains a predetermined level, and a drying subsystem for drying the air communicated to said reservoir, said drying subsystem including a pair of housings having inlet ports for receiving compressed air from said compressor and having delivery ports communicated to said reservoir, each of said housings containing a desiccant material, each of said inlet ports being connected to said compressor through a shuttle valve having a shuttle movable from a first position closing off one of said inlet ports and communicating the other inlet port to the compressor to a second position closing off the other inlet port and communicating the one inlet port to the compressor, said shuttle being responsive to a pressure signal to move between said first and second portions, timing means for generating said pressure signal moving said shuttle on a periodic timed basis, first check valve means connected between the delivery ports of said housings, an orifice around said first check valve means, and second check valve means permitting communication into said reservoir from the drying subsystem but preventing communication from said reservoir into said drying subsystem.

2. Compressed air apparatus as claimed in claim 1, wherein each of said housings include a purge port, said subsystem including a purge shuttle valve having a purge shuttle movable from a first condition communicating one of said purge ports and atmosphere while closing off said other purge port to a second condition closing off the one purge port and communicating the other purge port to atmosphere.

3. Compressed air apparatus as claimed in claim 2; wherein said purge shuttle is responsive to said pressure signal generated by said timing means and each of said shuttle valves includes a control port for receiving said pressure signal, said timing means including a solenoid valve and a timer operating said solenoid valve, said solenoid valve controlling communication of said pressure signal from said reservoir to each of said control ports.

4. Compressed air apparatus as claimed in claim 3, wherein said subsystem includes means responsive to said governor pressure signal for disabling said solenoid valve when the compressor is disabled.

5. Compressed air apparatus as claimed in claim 3, wherein said subsystem includes pressure responsive switch means for disabling said timing means until the pressure level in the reservoir attains a predetermined pressure level.

* * * * *